United States Patent [19]

Denkmann et al.

[11] Patent Number: 4,820,192
[45] Date of Patent: Apr. 11, 1989

[54] CONNECTING BLOCK CONSTRUCTION

[75] Inventors: W. John Denkmann; Leonard H. Drexler, both of Carmel, Ind.; Ronald H. Guelden, Shreveport, La.; William T. Spitz, Indianapolis, Ind.

[73] Assignees: American Telephone and Telegraph Company, New York, N.Y.; AT&T Information Systems Inc., Morristown, N.J.

[21] Appl. No.: 204,811

[22] Filed: Jun. 10, 1988

[51] Int. Cl.⁴ .......................................... H01R 23/02
[52] U.S. Cl. .................... 439/404; 439/676; 379/399
[58] Field of Search ........ 439/344, 395, 396, 402–405, 439/425, 638, 676, 76; 379/27, 399, 412, 419

[56] References Cited

U.S. PATENT DOCUMENTS

| | | | |
|---|---|---|---|
| 4,188,505 | 2/1980 | O'Connor | 179/1 PC |
| 4,261,633 | 4/1981 | Abernethy | 439/405 |
| 4,286,835 | 9/1981 | Adams et al. | 439/395 |
| 4,369,340 | 1/1983 | Beatenbough | 179/146 |
| 4,392,701 | 7/1983 | Weidler | 439/638 |
| 4,536,050 | 8/1985 | Hung | 439/404 |
| 4,545,635 | 10/1985 | Bunnell | 439/404 |
| 4,555,158 | 11/1985 | Lam | 439/404 |
| 4,580,864 | 4/1986 | Knickerbocker | 339/98 |
| 4,597,623 | 7/1986 | Krumreich | 339/97 |
| 4,731,833 | 3/1988 | Gumb et al. | 379/399 |

OTHER PUBLICATIONS

AMP Champ Multi-Jack Adapter Data Sheet 81-635.
Telephony Magazine, Sep. 28, 1987, p. 133.
Teleconnect Magazine, Dec. 1987, p. 19.
Teleconnect Magazine, Dec. 1987, p. 188.
AT&T Technical Digest, "Printed Wiring Board Modular Jack", R. R. Goodrich and C. L. Krumreich, Jul. 1984.
Product Brochure—Leviton 625 Quick Jack.
Product Brochure—Thomas & Betts, "Field-Installable Station Wire Connector Sysem".

Primary Examiner—Gary F. Paumen
Attorney, Agent, or Firm—Michael A. Morra

[57] ABSTRACT

An easily assembled connecting block provides interconnection between modular plugs and insulated telephone wires or the like. The connecting block includes: (i) a metallic lead frame comprising a number of flat elongated conductive elements that terminate in closely spaced flat wires at one end thereof, (ii) an equal number of metallic connectors that electrically couple to the conductive elements of the lead frame and further provide at least two pairs of opposing contact fingers for insulation displacement; and (iii) a dielectric block for receiving the closely spaced wires within a jack housing contained therein and for supporting the metallic lead frame. In one embodiment the connectors are an integral part of the lead frame itself and are "sandwiched" between a pair of dielectric blocks, each block having a plurality of corresponding slots for guiding wires into the region between opposing contact fingers of the connectors.

15 Claims, 5 Drawing Sheets

CONNECTING BLOCK CONSTRUCTION

TECHNICAL FIELD

This invention relates to a telephone connecting block for interconnecting modular plugs to a wire-pair, and more particularly to an efficient assembly of common components comprising the connecting block.

BACKGROUND OF THE INVENTION

Connecting blocks are used extensively in telecommunications equipment to provide telephones, modems and the like with easy access to communication cables and signal routing equipment. Easy access is achieved through the use of modular jacks and plugs which quickly provide connections for up to eight wires. Indeed, the popularity of such modular equipment is such that it is standard equipment on new telephones and data communications equipment. A desirable feature for connecting blocks is the easy interconnection of insulated wires and the provision of a junction point for the parallel connection of incoming wires, outgoing wires, and modular jack wires.

Known connecting blocks such as AT&T's 42-type connecting block, shown in U.S. Pat. No. 4,188,505, provide a hard-wire connection between the modular jack and the junction point. Here, the junction point comprises a screw-down terminal for making electrical connection to a telephone cord whose wires have been stripped of their insulation. The associated modular jack is joined to the screw-down terminals through snap on screw-engaging connectors.

U.S. Pat. No. 4,597,623 discloses a connector assembly that combines a screw terminal with an insulation displacement connector for use in the connecting block. Interconnection with modular jack wires may be accomplished through screw-engaging connectors or spade connectors individually wired to the modular jack. Such hard-wire connections are not easily adapted to automated assembly, are more costly, and detract from product uniformity.

U.S. Pat. No. 4,580,864 discloses a modular connecting block that provides hard-wire to hard-wire interconnections. Each junction point offers a wire-wrap capability and two insulation displacement connections. However, no provision is offered for interconnection with modular plugs.

It is, therefore, an object of the present invention to design a connecting block having a modular jack and providing a junction point for easily interconnecting two or more insulated wires with each jack wire.

It is another object of the invention to provide a design that is suited for automated assembly.

SUMMARY OF THE INVENTION

In accordance with the present invention, a new design for a connecting block is disclosed. It comprises: a lead frame having a number of flat elongated conductive elements which include jack wires as an integral part of its construction; an equal number of connectors, each having at least two pairs of opposing contact fingers that extend upwardly from a common region that provides structural stability and electrical interconnection between the pairs of contact fingers, the common region of each connector also being connected to one of the conductive elements of the lead frame; and a first dielectric block adapted to receive and hold the lead frame and having apertures for receiving the connectors.

In accordance with a further aspect of the invention, a second dielectric block cooperates with the first dielectric block to contain the lead frame, the dielectric blocks being adapted to provide a jack frame for receiving the jack wire portion of the lead frame and support members for the connectors.

DETAILED DESCRIPTION

The present invention offers a number of advantages including commonality of parts; automated assembly; robust construction; reliable, fast and familiar insulation-displacing connectors; and product line consistency. These advantages are inherent in each of three alternative embodiments shown in FIG. 1, 3, 4. First, however, a prior art connecting block shown in FIG. 5, is considered.

Figure 5:
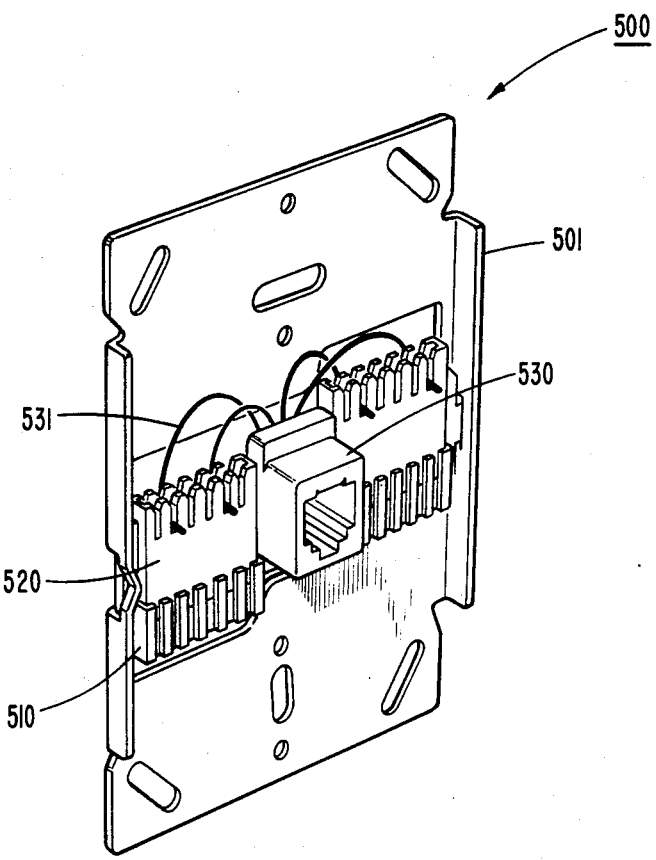
FIG. 5 discloses a prior art connecting block.

FIG. 5 discloses a prior art connecting block similar to the wall Telephone Adapter Assembly shown in U.S. Pat. No. 4,369,340. Connecting block 500 comprises steel base 501 which provides structural support for modular jack 530 and connector assemblies 520. Insulated wires 531 are attached to jack 530 in a prior assembly step. Further, these wires are specially connected, at one end, to phosphor-bronze wires suitably flexible for use within jack 530. At the other end, these wires are pushed into slots associated with connector assembly 520. Within each of the two connector assemblies shown, there are a pair of H-shaped connectors, each leg of which comprises an opposing pair of contact fingers used for insulation displacement. The top portion of connector assembly 520 is used for connecting four or six wires from modular jack 530 while the bottom portion provides eight or twelve slots respectively, each having a pair of insulation displacing contact fingers, for interconnecting external wires (telephone cord) to jack wires 531. Wire insertion caps 510 are useful in pushing the external wires into the slots. It is noted that although the connecting block of FIG. 5 is an excellent design, it is not easily adapted to automated assembly.

SURFACE MOUNT CONNECTING BLOCK

Figure 1:
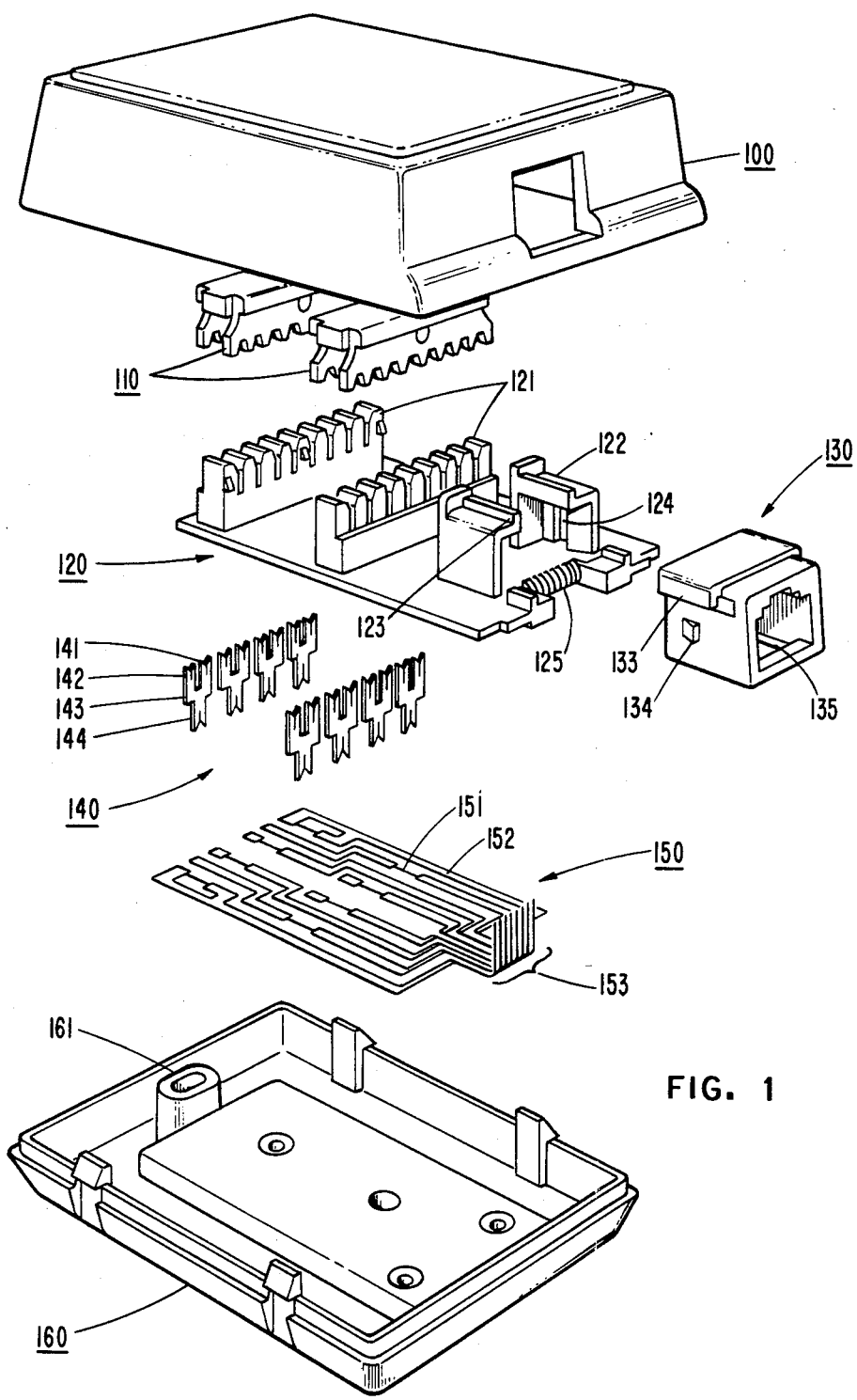
FIG. 1 discloses a surface mount connecting block in accordance with the present invention.

FIG. 1 discloses a first embodiment of the invention in the form of a surface mount connecting block that may be attached to a surface using either mounting screws, double-sided tape or magnets. The connecting block includes a number of components that may be readily assembled by means of automated equipment. Cover 100 and Base 160 are molded dielectric materials that join together to contain and isolate electrical connections within a convenient structure. Included within base 160 is an opening 161 for admitting a mounting screw that allows for easy surface mounting.

Dielectric block 120 is also molded from dielectric material and includes apertures 126, 127 (see FIG. 2) for receiving up to eight insulation-displacement connectors 140. After connectors 140 are inserted into dielectric block 120, lead frame 150 is pressed into place. Narrow portions 151 of the lead frame electrically engage each of the downwardly extending contact fingers 144 of connectors 140. Metallic connectors 140 each include two pairs of upwardly extending contact fingers (141,142) that displace the insulation of wires inserted therein, make electrical connection, and mechanically hold the wires in a fixed position, thereby facilitating the interconnection of insulated wires. It is significant tha two pairs of upwardly extending contact fingers (141,142) are provided because it is generally necessary to handle incoming and outgoing wires in typical telephone wiring. Bridging connections onto a single wire pair is preferred over a "star' wired configuration.

The connectors 140 are made from 15 mil stamped metal stock. The slanted portions at the extremities of the contact fingers are coined to assist in cutting through a wire's insulation. The contact fingers (141, 142, 144) share a common region 143 that provides structural stability and electrical interconnection.

Dielectric block 120 further includes jack support members 122 for receiving jack frame 130. Jack support 122 comprises two upward standing members having a receiving portion 123 for engaging shoulder 133. Jack frame 130 further includes a pair of tabs 134, one on each side thereof, for interlocking with a pair of tab-receiving channels 124. Specifications for modular plugs and jacks such as used in connection with the present invention can be found in Subpart F of the FCC Part 68.500 Registration Rules. Opening 135 is adapted to receive a conventional modular plug.

Lead frame 150 is an interconnection pattern stamped from 15 mil metal stock that is selectively gold plated in the region of the jack wires 153. It is a single rigid piece-part whose peripheral support members are not shown. It is captured on the bottom side of dielectric block 120 which includes grooves having the same pattern as the lead frame itself. Lead frame 150 comprises 8 flat elongated conductive elements that individually interconnect one of jack wires 153 with one of connectors 140. Each conductor includes a wide area 152 and a narrow area 151. The narrow area accommodates interconnection with the downwardly extending contact fingers 144 of each connector 140.

Wires enter the connecting block through side openings (not shown) and are pressed into wire slots contained in terminal strip 121. The wires may be pushed into the slot by wire insertion cap 110 where insulation is displaced and electrical connection is made with one pair of upwardly extending contact fingers (141 or 142) of connector 140.

Figure 2:
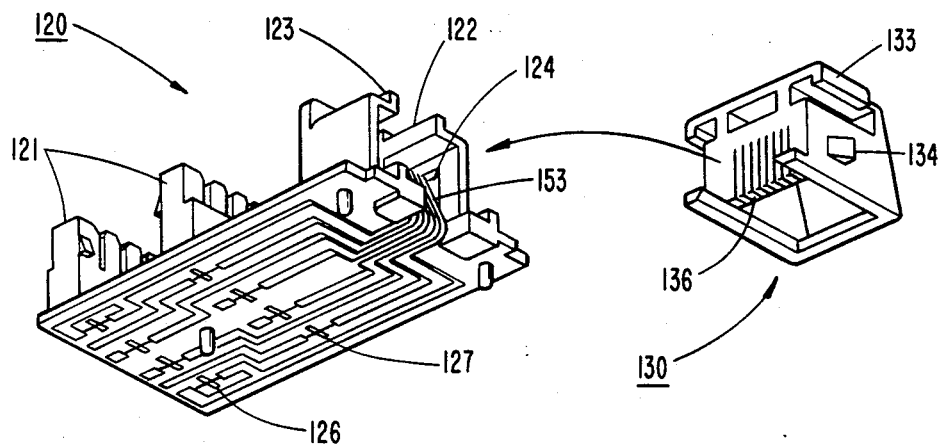
FIG. 2 illustrates the interconnection and cooperation between a dielectric block, a lead frame, and a jack frame in accordance with the invention.

FIG. 2 provides a more detailed view of the cooperation between lead frame 150, dielectric block 120 and jack frame 130. Although not shown, lead frame 150 includes small holes in the wide areas of each of its conductive elements 152. These holes fit over cylindrical pins molded into the grooves at the bottom of dielectric block 120. Once lead frame 150 is in place, the pins are deformed to hold it in place. Jack wires 153 are deformed upwardly into cut-out area 125 of the dielectric block. Jack frame 130 is thereafter snapped into place, engaging each of the jack wires 153 individually into its vertical comb-like teeth 136. Wedge-shaped locking tabs 134 hold jack frame 130 in place.

FLUSH MOUNT CONNECTING BLOCK

Figure 3:
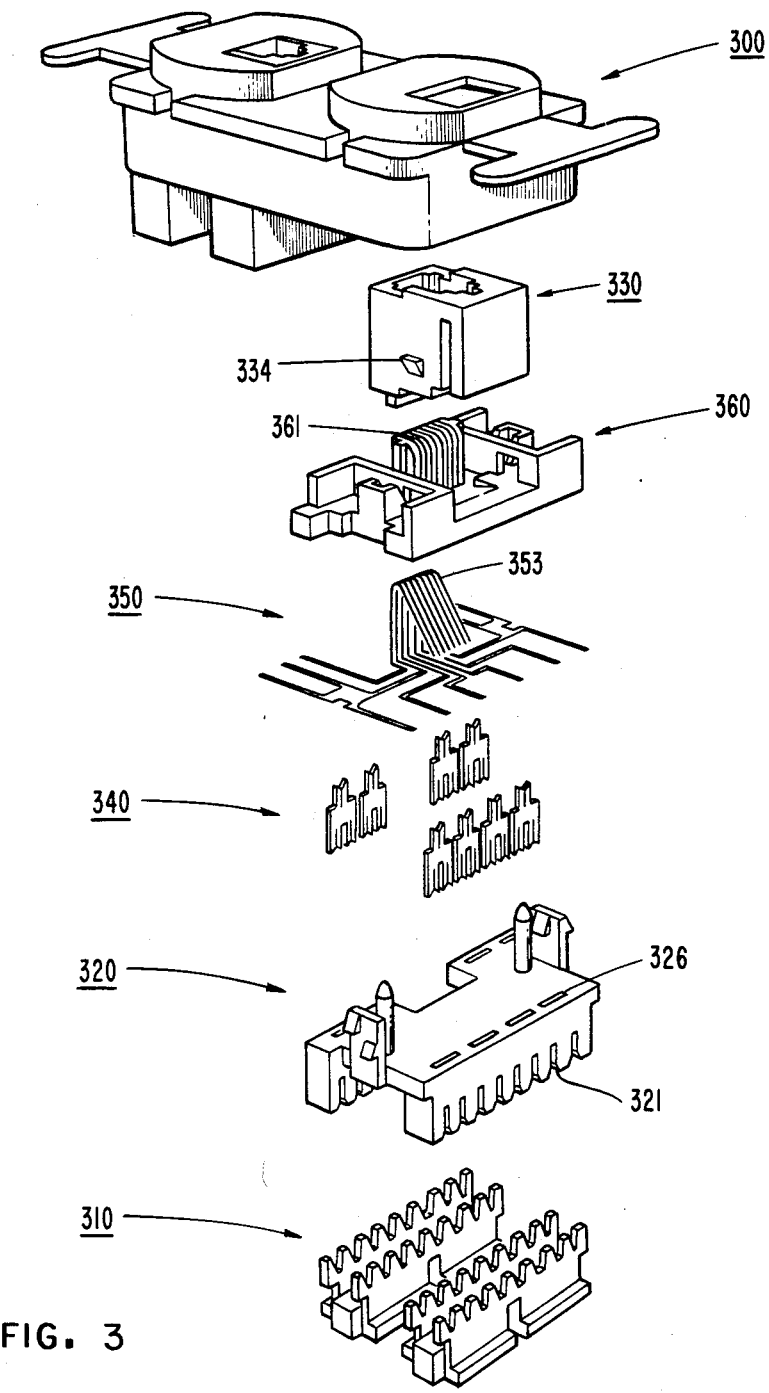
FIG. 3 discloses a flush mount connecting block showing a second embodiment of the present invention.

FIG. 3 discloses a flush mount connecting block in accordance with a second embodiment of the invention. Similar in shape to a conventional electrical power receptacle, it is designed to mount onto a wall surface with minimum protrusion away from the wall. Dimensionally, frame 300 is the same size as the electrical power receptacle; it uses the same wall box for convenient mounting and accepts the same faceplate. Jack frame 330, spring block 360, and dielectric block 320 are dielectric parts that snap together to enclose lead frame 350 and insulation-displacement connectors 340.

Lead frame 350 includes jack wires 353 that are bent upwardly after engagement with spring block 360. Spring block 360 includes support member 361 having grooves therein for containing jack wires 353, around which the jack wires are bent downwardly. After such bending, jack frame 330 is joined to spring block 360 and held in place by locking tab 334. Y-shaped connectors 340 electrically interconnect with the conductive paths of lead frame 350 and slide into apertures 326 of dielectric block 320. Wires pressed into terminal strip 321 have their insulation displaced by connectors 340 and enjoy good electrical and mechanical connection. Wire insertion cap 310 assists in this operation.

WALL MOUNT CONNECTING BLOCK

Figure 4:
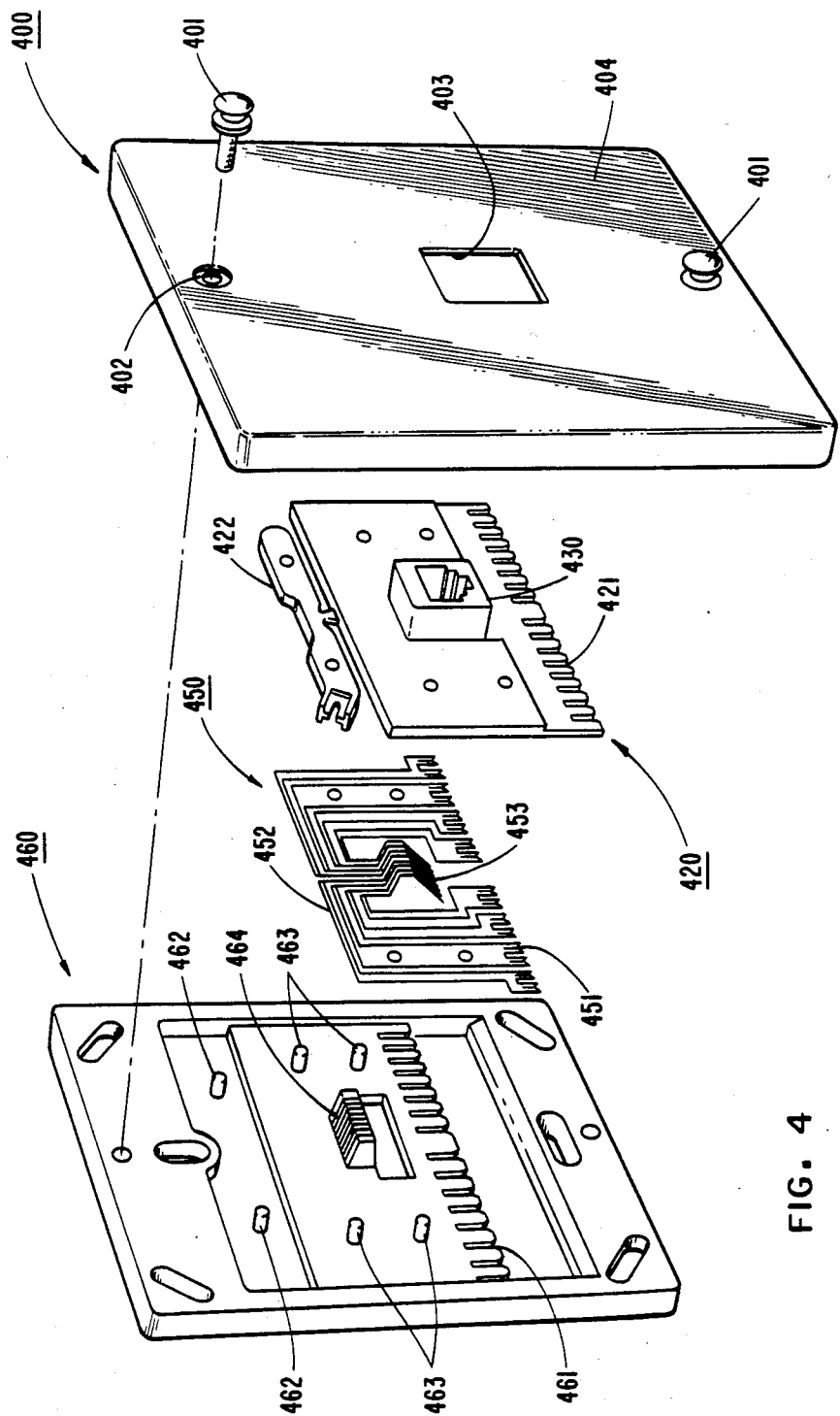
FIG. 4 discloses a wall mount connecting block, showing a third embodiment of the present invention.

FIG. 4 discloses a third embodiment of the present invention designed to function both as a connecting block and as a mechanical support for wall mounted telephones. While similar to the embodiments of FIG. 1, FIG. 3 it differs in that the connectors are now an integral part of the same lead frame, and in the two-piece construction of the terminal strip supporting the insulation-displacement connectors.

Bracket 460 is a single-piece, molded, dielectric part that cooperates with lead frame 450 and dielectric block 420 to provide an easily assembled wall mount connecting block. Bracket 460 includes four pins 463 that secure lead frame 450 and dielectric block 420 in a fixed positional relationship to each other. Although not shown, grooves are molded into bracket 460 that match the shape of the lead frame's conductive elements and hold the lead frame in place. Faceplate 400 joins with bracket 460 using mounting studs 401 capable of supporting a wall-mounted telephone set. Pins 463 are deformed to hold dielectric block 420 in place.

Although not shown, lead frame 450 includes an outer carrier member that holds the individual conductive elements 452 in a fixed position relative to each other until after the lead frame is joined to bracket 460. The carrier is then cut away. Lead frame 450 is stamped from the same material used in the lead frames of FIG. 1 and FIG. 3. Insulation-displacement connectors 451 are included in lead frame 450 as an integral part thereof. As with the other connectors disclosed, the ends are coined to facilitate the cutting of insulation that surrounds the wires to be pressed into the connectors.

Jack wires 453 are pre-formed by stamping and cooperate with support member 464 and jack frame 430 to provide a modular jack. Tool 422 is formed in the molding of dielectric block 420 as a part thereof, but is easily broken away therefrom. It is used to facilitate the insertion of wires into the slots formed by the joinder of dielectric block 420 and bracket 460. After usage, the tool is stored on pins 462 which pass through mating holes molded into tool 422. Comb-like slots 421 and 461 combine to form wire slots that align with each pair of opposing fingers on insulation-displacement connectors 451.

Although three different embodiments of the invention have been disclosed, it is clear that various modifications are possible within the spirit and scope of the invention.

We claim:

1. A connecting block comprising:
  a metallic lead frame having a plurality of flat elongated conductive elements, said conductive elements terminating in closely spaced flat wires at one end of said lead frame;
  a plurality of metallic connectors of generally flat elongated construction, each connector including at least two pairs of opposing, insulation-displacing contact fingers integral with, and extending upwardly from, a common region thereof, each common region engaging one of the conductive elements at the other end of the lead frame;
  a dielectric block which holds the metallic lead frame and contains the upwardly extending contact fingers of the connectors; and
  a dielectric jack housing, adapted to receive a modular telephone plug inserted therein, and which contains the closely spaced flat wires of the lead frame.

2. The connecting block of claim 1 wherein the common region of each metallic connector includes a downwardly extending pair of contact fingers which engage one of the conductive elements of the lead frame.

3. The connecting block of claim 1 wherein said dielectric block includes at least one terminal strip which contains the upwardly extending pairs of insulation displacing contact fingers, the terminal strip including one slot for each pair of contact fingers for guiding wires into contact with said contact fingers.

4. The connecting block of claim 1 wherein said dielectric block includes at least one terminal strip which comprises a plurality of cavities which contain said connectors placed therein, each cavity being electrically insulated from the others and each cavity including an aperture at one end thereof which receive one of the connectors.

5. The connecting block of claim 4 wherein each cavity of said terminal strip further includes a pair of slots at the other end thereof for guiding wires into contact with the insulation displacing contact fingers of the connector contained within the cavity.

6. The connecting block of claim 1 wherein the dielectric block includes a pattern of grooves on one side thereof that substantially conforms to the shape of the lead frame, the pattern of grooves receiving and holding the lead frame in a fixed position.

7. The connecting block of claim 6 wherein the dielectric jack housing includes a plurality of comb-like teeth, cooperating with said pattern of grooves on the dielectric block, separating the closely spaced flat wires from each other and holding them in a fixed relation to each other.

8. The connecting block of claim 7 wherein the jack housing and the dielectric block include means which mechanically interlock to form a single unit.

9. In combination:
  a metallic lead frame having a plurality of flat elongated conductive elements, said conductive elements terminating in closely spaced flat wires at one end thereof;
  a plurality of Y-shaped flat metallic connectors, each connector including: (i) two pairs of upwardly extending contact fingers, each said pair adapted to displace insulation from a wire inserted therein, and (ii) one pair of downwardly extending contact fingers engaging one of the conductive elements of the metallic lead frame; and
  a dielectric block having apertures therein for receiving and supporting the upwardly extending contact fingers of the Y-shaped flat metallic connectors, said dielectric block further including a dielectric jack housing which contains the closely spaced flat wires of the metallic lead frame, said jack housing adapted to receive a modular telephone plug inserted therein.

10. The combination of claim 9 wherein the conductive elements of the lead frame include relatively wide and relatively narrow areas, said relatively narrow areas being used for electrical interconnection with the downwardly extending contact fingers of each Y-shaped connector.

11. The combination of claim 9 wherein the dielectric jack housing physically attaches to the dielectric block with locking tabs.

12. The combination of claim 11 wherein the dielectric jack housing further includes a plurality of comb-like teeth which separate closely spaced flat wires from each other and hold them in a fixed relation to each other.

13. In combination:
  a metallic lead frame having a plurality of flat elongated conductive elements, said conductive elements terminating in closely spaced flat wires at one end thereof;
  a plurality of Y-shaped flat metallic connectors, each connector including: (i) two pairs of downwardly extending contact fingers adapted to displace insulation from a wire inserted therein, and (ii) one pair of upwardly extending contact fingers engaging one of the conductors of the metallic lead frame;
  dielectric block having apertures therein which receive and support the downwardly extending contact fingers of the Y-shaped flat metallic connectors; and
  a second dielectric terminal block engaging said first dielectric terminal block and sandwich the metallic lead frame therebetween, the second terminal block including a jack housing which contains the closely spaced flat wires of the metallic lead frame, said jack housing adapted to receive a modular telephone plug inserted therein.

14. The combination of claim 13 wherein the conductive elements of the lead frame include relatively wide and relatively narrow areas, said relatively narrow areas being used for electrical interconnection with the upwardly extending contact fingers of each said Y-shaped connector.

15. The combination of claim 14 wherein the dielectric jack housing mechanically interlocks with the terminal block using wedge-shaped tabs.

* * * * *